(12) United States Patent
Liao (10) Patent No.: US 9,274,262 B2
(45) Date of Patent: Mar. 1, 2016

(54) LIGHT GUIDING PLATE, BACKLIGHT MODULE AND DISPLAY DEVICE

(71) Applicant: INNOLUX CORPORATION, Miao-Li County (TW)

(72) Inventor: Ming Yi Liao, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 81 days.

(21) Appl. No.: 14/134,404

(22) Filed: Dec. 19, 2013

(65) Prior Publication Data

US 2014/0185322 A1    Jul. 3, 2014

(30) Foreign Application Priority Data

Dec. 28, 2012 (CN) .......................... 2012 1 0589568

(51) Int. Cl.
*F21V 7/04* (2006.01)
*F21V 8/00* (2006.01)

(52) U.S. Cl.
CPC ............ *G02B 6/0038* (2013.01); *G02B 6/0061* (2013.01)

(58) Field of Classification Search
CPC .... G02B 6/0018; G02B 6/002; G02B 6/0033; G02B 6/0045; G02B 5/0221
USPC .......................... 362/615, 619, 623, 625, 628
See application file for complete search history.

(56) References Cited

U.S. PATENT DOCUMENTS

| 5,838,403 A | 11/1998 | Jannson et al. |
| 6,123,431 A * | 9/2000 | Teragaki et al. ............... 362/625 |
| 2008/0285309 A1 * | 11/2008 | Fang et al. ..................... 362/620 |
| 2012/0195064 A1 * | 8/2012 | Oku et al. ...................... 362/602 |

FOREIGN PATENT DOCUMENTS

| CN | 201159778 Y | 12/2008 |
| CN | 102629021 A | 8/2012 |
| TW | I349121 | 9/2011 |

OTHER PUBLICATIONS

Taiwan Patent Office, Office action issued on Oct. 16, 2014.
China Patent Office, Office action issued on Dec. 18, 2015.

* cited by examiner

*Primary Examiner* — William Carter
(74) *Attorney, Agent, or Firm* — Li & Cai Intellectual Property (USA) Office (57) ABSTRACT

A light guiding plate includes a light guiding main body, a first light guiding unit and a second light guiding unit. The light guiding main body has a first surface, a second surface opposite to the first surface and a light inlet face connecting between the first and second surfaces. The first light guiding unit includes first and second light guiding structures disposed on the first surface. The first and second light guiding structures are parallel aligned, each second light guiding structure has a plurality of first light guiding bodies that is individually separating and connecting the immediately abreast first light structures, and the arrangement density of the plurality of first light guiding bodies decreases toward the light inlet face. The second light guiding unit includes a plurality of third light guiding structures disposed on the second surface. The third light guiding structures are parallel arranged.

10 Claims, 15 Drawing Sheets

LIGHT GUIDING PLATE, BACKLIGHT MODULE AND DISPLAY DEVICE

BACKGROUND

1. Field of the Invention

The instant disclosure relates to a light guiding plate, a backlight module and a display device using the same; in particular, to a multi-dimensional light guiding plate, a backlight module and a display device using the same.

2. Description of Related Art

The panel of a liquid crystal display does not generate light itself. The light source relies on a backlight module in showing any image. The brightness, efficiency and color rendering property of the backlight module determine the image quality of the display device. Therefore, studies concerning the backlight module development are thriving.

In general, the backlight module includes a light source, a light guiding plate, a reflection film, a diffuser film and offsets of prism films. The light source is disposed on one side of the light guiding plate or the opposite side. The light beams are emitted to the light guiding plate. The light guiding plate serves to lead the travelling direction of the light beam and evenly distribute the light. In the prior art, a light guiding plate for the backlight module is disclosed, and the light is more effectively distributed via the light guiding plate. However, the bottom of the light guiding plate is one-dimension, and therefore the optical performance is not maximized.

BRIEF SUMMARY OF THE INVENTION

The instant disclosure provides a multi-dimensional light guiding plate, effectively enhancing overall optical performance. The instant disclosure also provides a backlight module and a display device using the same.

According to one exemplary embodiment of the instant disclosure, the light guiding plate includes a light guiding main body, a first light guiding unit and a second light guiding unit. The light guiding main body has a first surface, a second surface opposite to the first surface and a light inlet face connecting between the first and second surfaces. The first light guiding unit includes a plurality of first light guiding structures and a plurality of second light guiding structures disposed on the first surface. The pluralities of the first and second light guiding structures are parallel aligned, each of the second light guiding structures has a plurality of first light guiding bodies that is individually separating and connecting the immediately abreast first light structures, and the density of the plurality of first light guiding bodies decreases toward the light inlet face. The second light guiding unit includes a plurality of third light guiding structure disposed on the second surface. The plurality of the third light guiding structures is parallel arranged.

According to another embodiment of the instant disclosure, the backlight module includes the light guiding plate and light emitting components. The light emitting components are disposed proximate to the light inlet face, and the light generated by the light emitting components enters the light guiding main body via the light inlet face.

According still another embodiment of the instant disclosure, the display device includes the backlight module and a display panel. The display panel is disposed on the top of the light guiding plate. The light generated by the light emitting components travels through the light guiding plate and projects onto the display panel.

The light guiding plate, backlight module and the display device using the same have the multi-dimensional, first light guiding unit, which has the pluralities of first and second light guiding structures, and the second light guiding unit, which has the plurality of third light guiding structures. The light guiding units enhance the strength for retaining an optical film and reduce any unwanted light loss (for example, loss caused by light diffusion). The overall brightness increases thereby, and the occurrence of optical interference stripe or Moire (for example, Newton's rings) is reduced. Generally, the optical effectiveness is greatly improved.

In order to further understand the instant disclosure, the following embodiments are provided along with illustrations to facilitate the appreciation of the instant disclosure; however, the appended drawings are merely provided for reference and illustration, without any intention to be used for limiting the scope of the instant disclosure.

DETAILED DESCRIPTION OF THE INVENTION

The aforementioned illustrations and following detailed descriptions are exemplary for the purpose of further explaining the scope of the instant disclosure. Other objectives and advantages related to the instant disclosure will be illustrated in the subsequent descriptions and appended drawings.

[First Embodiment]

Figure 1:
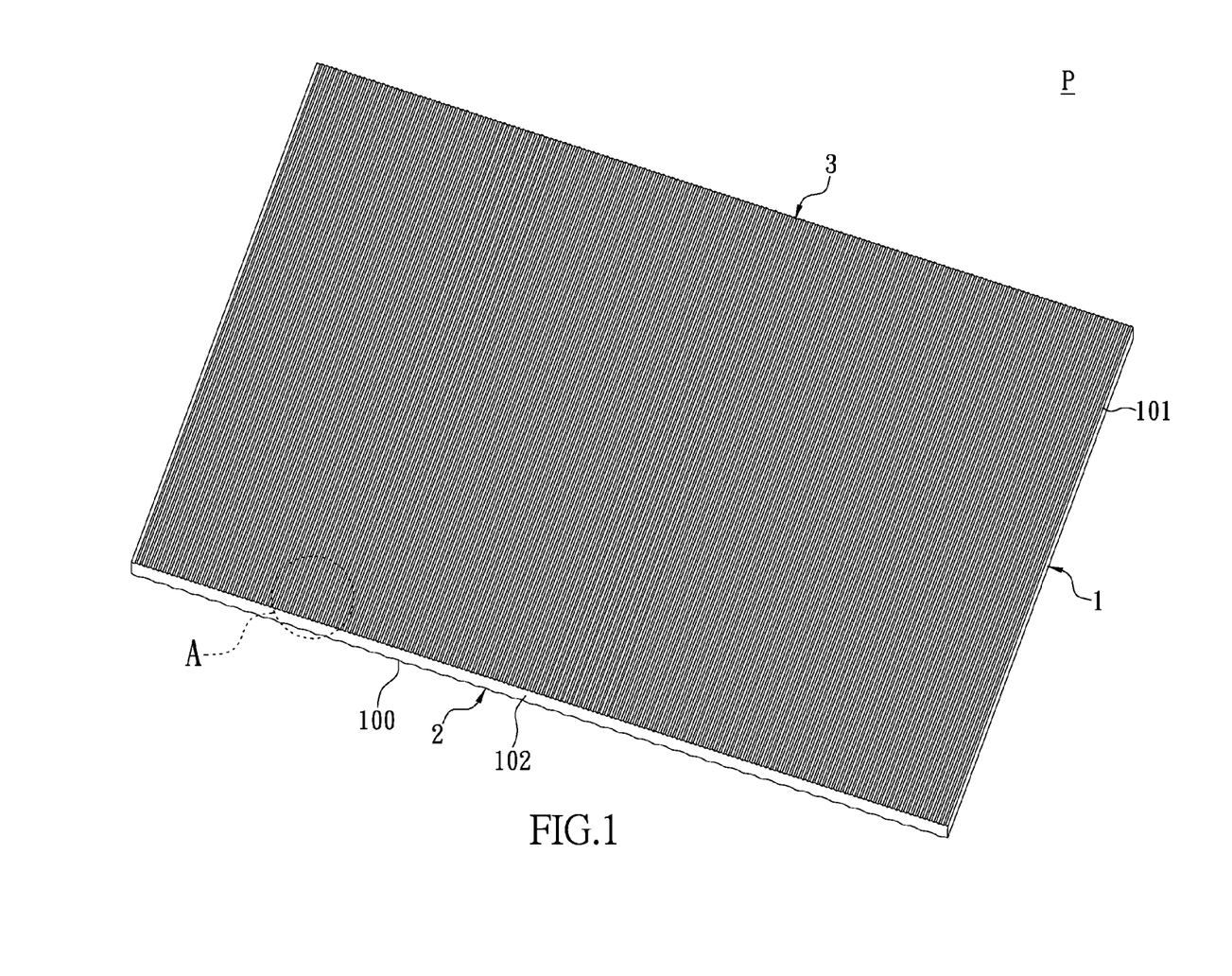
FIG. 1 is a perspective view of a light guiding plate in accordance with an embodiment of the instant disclosure.
Figure 2:
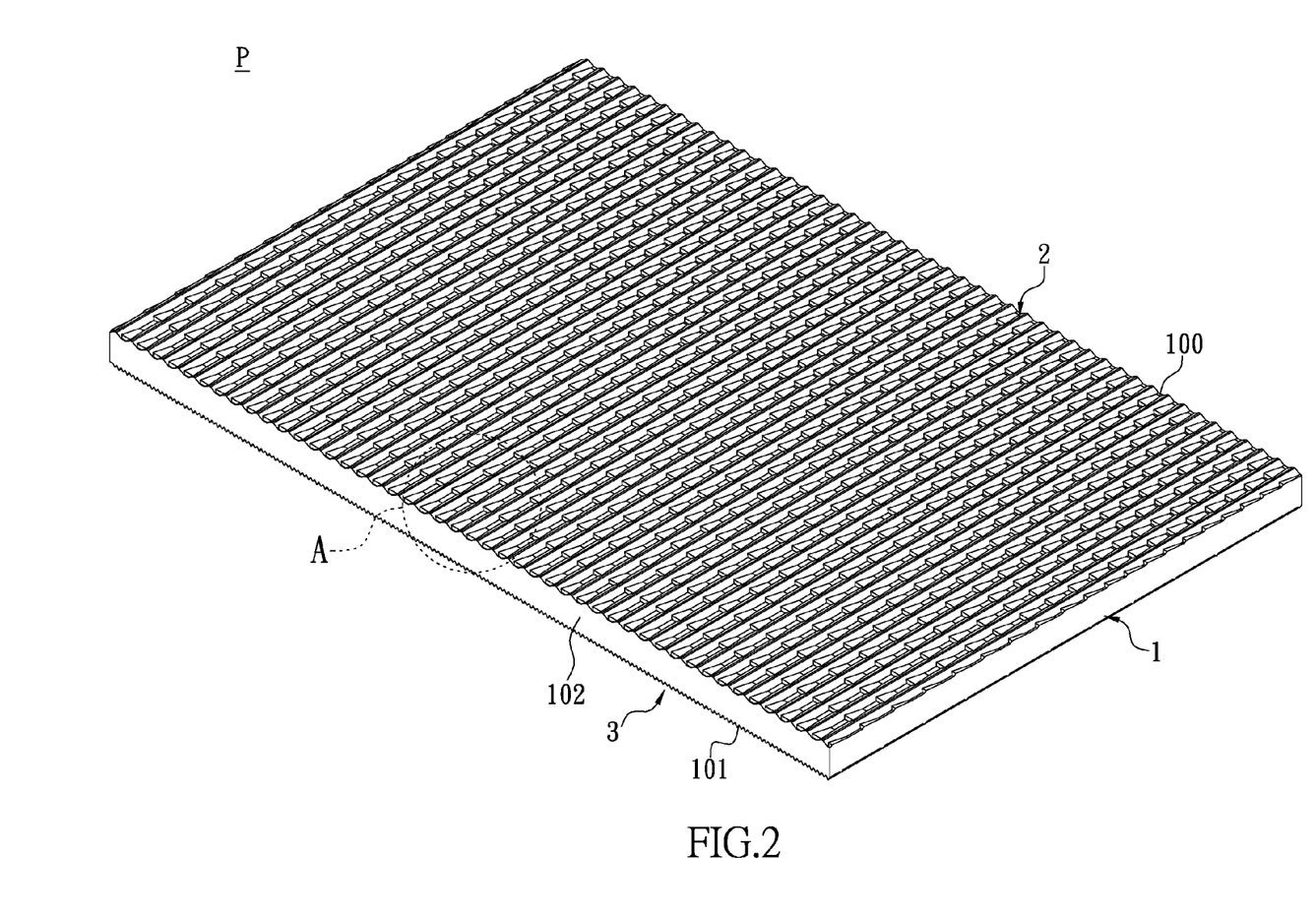
FIG. 2 is another perspective view of a light guiding plate in accordance with an embodiment of the instant disclosure.

Please refer to FIG. 1 in conjunction with FIG. 2. FIG. 1 is a perspective view of a light guiding plate. FIG. 2 is another perspective view of the light guiding plate. The light guiding plate P includes a light guiding main body 1, a first light guiding unit 2 and a second light guiding unit 3. The light guiding main body 1 has a first surface 100, a second surface 101 opposite to the first surface 100 and a light inlet face 102 connecting the first and second surfaces 100, 101. The first surface 100 and the second surface 101 may respectively be a reflection face and a light outlet face. Alternatively, the first surface 100 may be a light outlet face, while the second surface 101 may be a reflection face. The light guiding main body 1 may be a rectangular plate having identical thickness or wedged plate having different thickness. The thickness of the wedged plate increases toward the light inlet 102. It should be noted that in the instant embodiment, a rectangular configuration is adapted but the instant disclosure is not limited thereto.

The light guiding main body 1, the first light guiding unit 2 and the second light guiding unit 3 are integrally formed, such that the light guiding plate P is a one-piece element. The method to form a one-piece light guiding plate P may be press molding or injection molding, and the instant disclosure is not limited thereto. Take press molding for example. Optical plastics (for example, PMMA, PC or the like) are injected to precision mold of light guiding plate by high temperature and pressure (not shown). After curing, the transparent light guiding plate is retrieved. Take injection molding for example. The molding compound of the light guiding plate used in press molding can also be used. Three sides of the molding compound undergo high precision processing to generate microstructures having polished mirror like surface.

Figure 3:
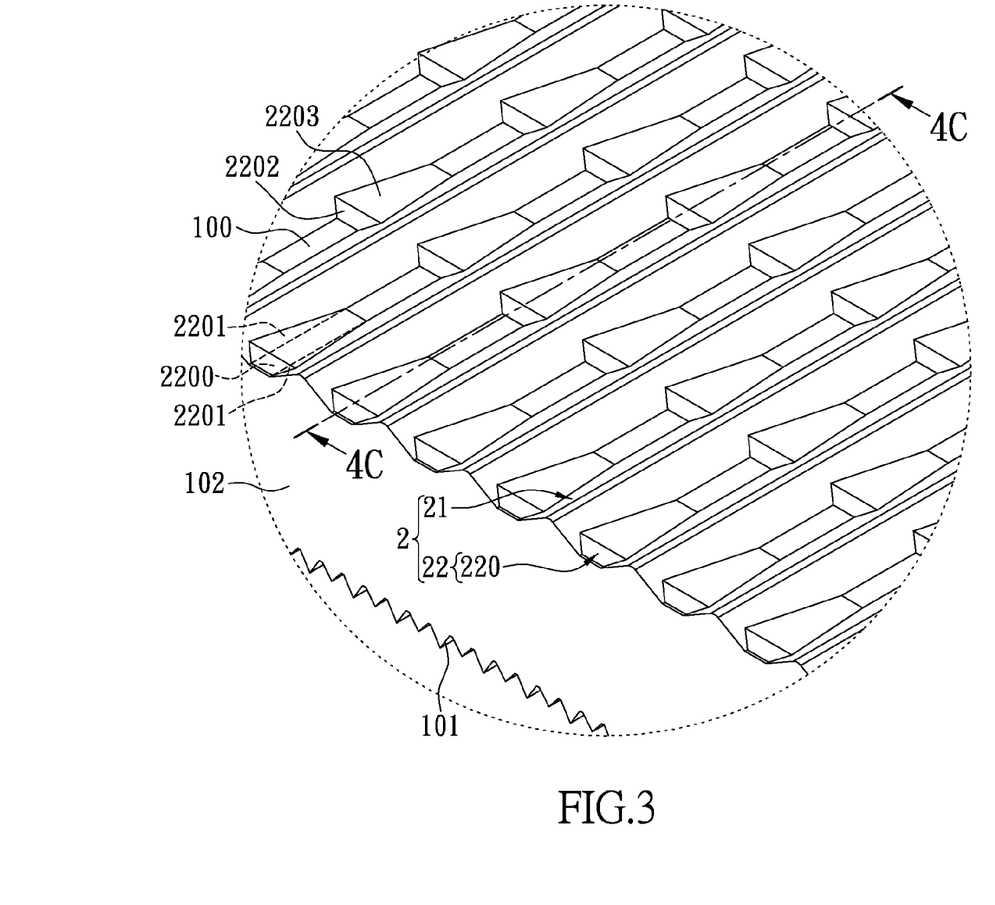
FIG. 3 is an enlarged view of region A in FIG. 2.
Figure 4A:
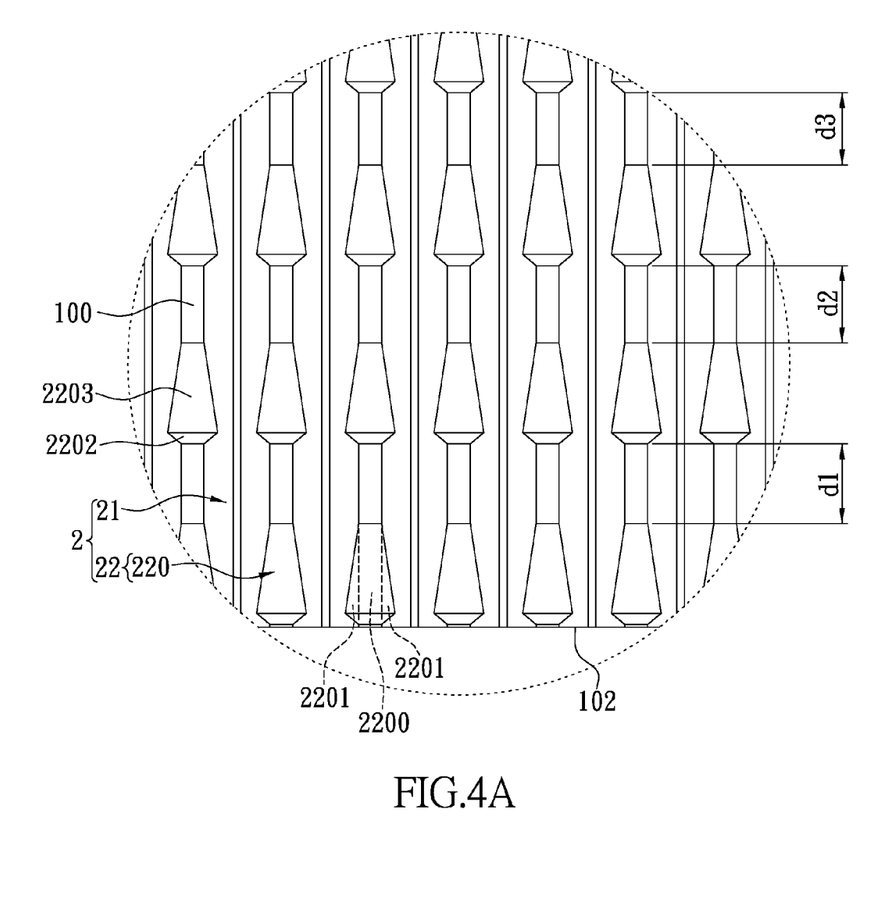
FIG. 4A is a top view of FIG. 3.
Figure 4B:
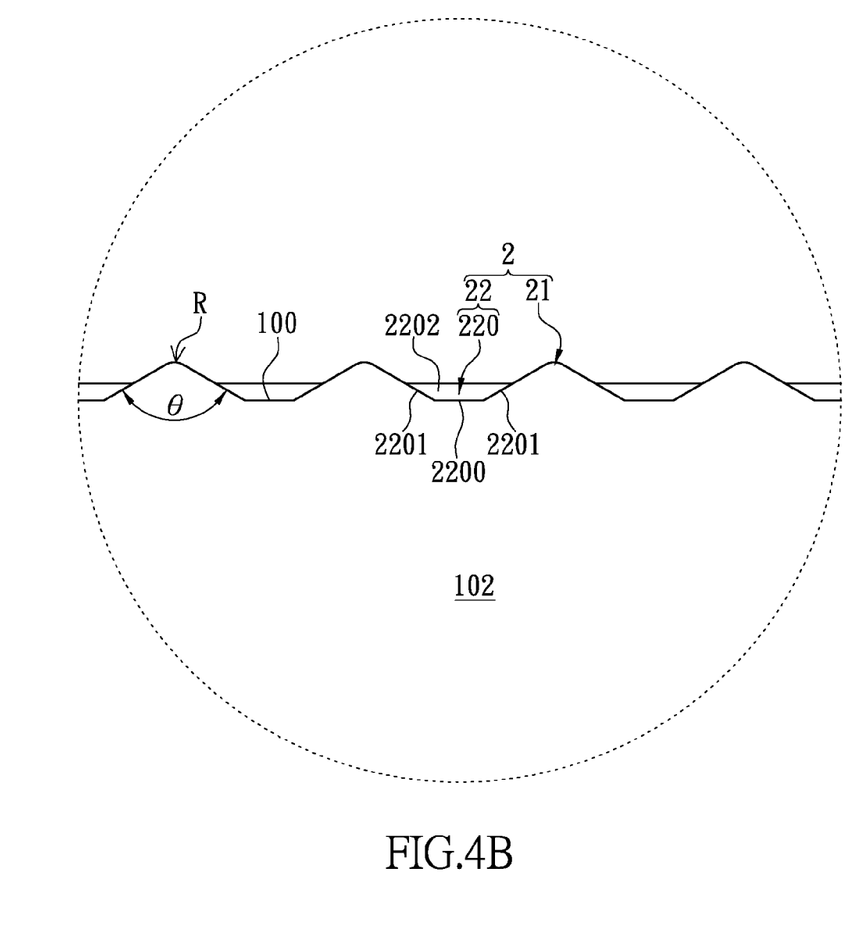
FIG. 4B is a side view of FIG. 3.
Figure 4C:
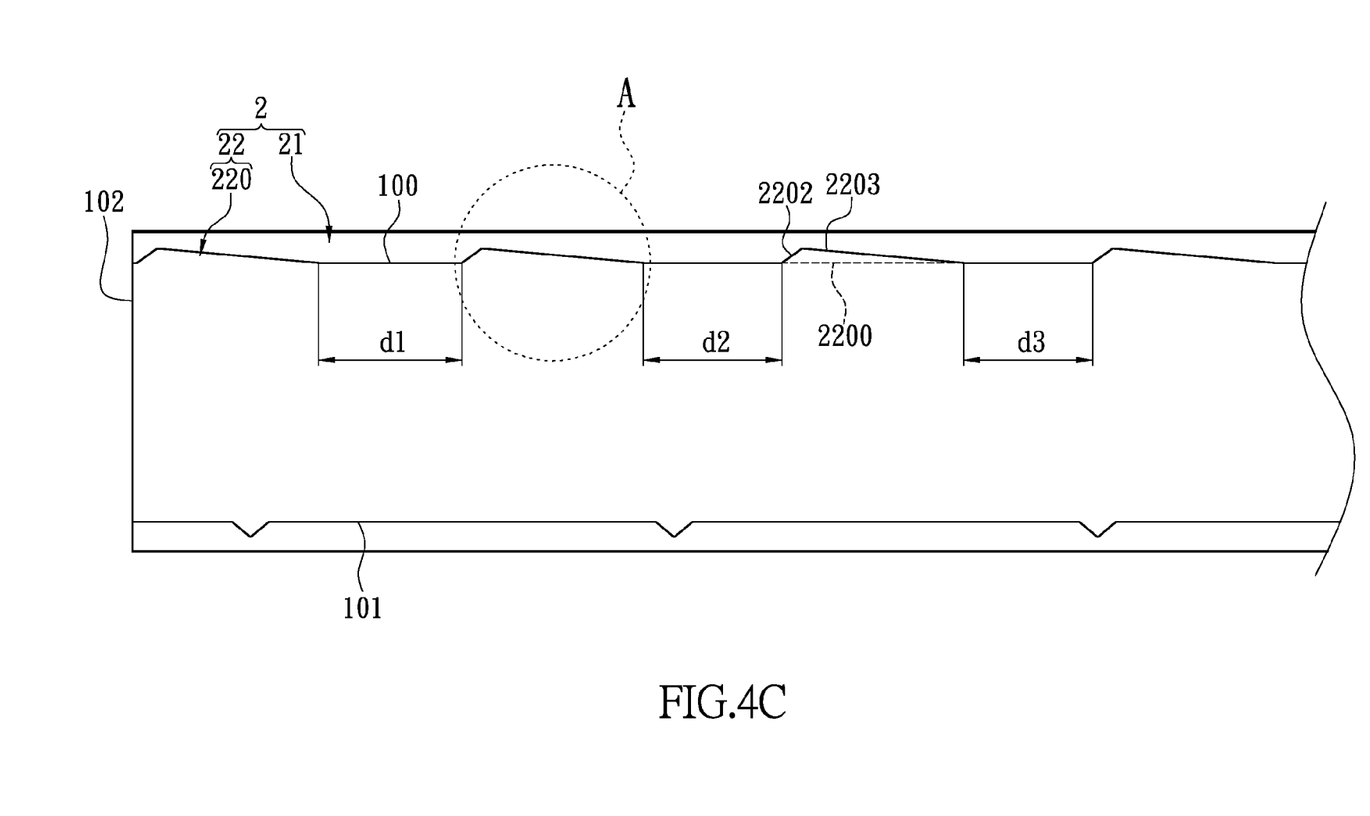
FIG. 4C is a cross-sectional view along the line 4C-4C in FIG. 3.
Figure 4D:
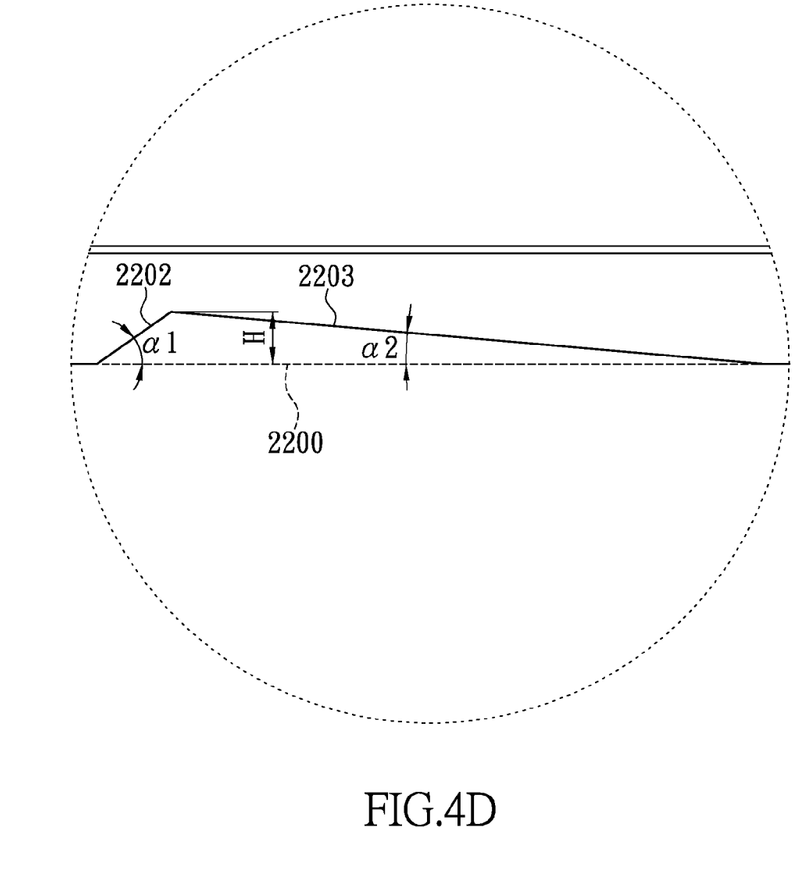
FIG. 4D is an enlarged view of region A in FIG. 4C.

Please refer to FIGS. 2, 3 and 4A to 4D. FIG. 3 is an enlarged view of region A in FIG. 2. FIG. 4A is a top view of FIG. 3. FIG. 4B is a side view of FIG. 3. FIG. 4C is a cross-sectional view along the line 4C-4C in FIG. 3. FIG. 4D is an enlarged view of region A in FIG. 4C. Please refer to FIG. 2 in conjunction with FIG. 3. The first light guiding unit 2 includes a plurality of first light guiding structures 21 and a plurality of second light guiding structures 22 both formed on the first surface 100. The first and second light guiding structures 21, 22 are parallel arranged.

The first light guiding structure 21 is further elaborated herein.

Firstly, please refer to FIG. 3 in conjunction with FIG. 4B. The first light guiding structures 21 are parallel arranged. According to FIG. 4B, the sides of the first light guiding structures 21 are discrete zigzags. However, the instant disclosure is not limited to this configuration.

Please refer to FIG. 3 in conjunction with FIG. 4B. Each of the first light guiding structures 21 is a triangular prism having a round corner R. The round corner R has a radius no more than 2 mm (R≤2 mm). The angle θ of the first light guiding structure 21 is no more than 175° (θ≤175°). Further still, each of the first light guiding structures 21 is a trapezoid having truncated top (not shown). The trapezoid is wider at the bottom (i.e., the trapezoid reduces toward the top). However, the configuration of the first light guiding structure 21 is not limited thereto.

The second light guiding structure 22 is further elaborated herein.

Firstly, please refer to FIGS. 2, 3, 4A and 4C. Each of the second light guiding structures 22 are in identical size and shape. Additionally, the density of the first light guiding bodies 220 of each second light guiding structure 22 reduces toward the light inlet face 102. In other words, as shown in FIGS. 4A and 4C, the distance (d1, d2, d3) between every two immediately abreast first light guiding bodies 220 of the second light guiding structure 22 increases toward the light inlet face 102 (i.e., d1>d2>d3). That is to say, the first light guiding bodies 220 are more densely arranged when they are further away from the light inlet face 220. This particular trend from sparse to dense can effectively increase the optical evenness.

Please refer to FIGS. 3, 4A, 4B and 4C. Each of the first light guiding body 220 has a first bottom face 2200, two first connecting faces 2201, a first slanting face 2202 and a second slanting face 2203. As shown in FIG. 4C, a reference line is depicted on the bottom of the first light guiding body 220 to emphasize the first bottom face 2200. The first bottom face 2200 is flushed against the first surface 100, and therefore the first bottom face 2200 and the first surface 100 are coplanar. The two first connecting faces 2201 slantingly extend from the first bottom face 2200 to connect the two neighboring first light guiding structures 21. In other words, the first connecting face 2201 is completely attached to the surface of the first light guiding structure 21. Therefore, the first connecting face 2201 and the surface of the first light guiding structure 21 are coplanar. The first slanting face 2202 and the second slanting face 2203 extend from the first bottom face 2200 and meet above the first bottom face 2200.

Furthermore, please refer to FIGS. 4A, 4C and 4D. The area of the first slanting face 2202 of each first light guiding body 220 is smaller than that of the second slanting face 2203. Additionally, the first slanting face 2202 is disposed closer to the light inlet face 102 than the second slanting face 2203. In other words, as shown in FIG. 4C, the cross-sectional view illustrates that the distance from the first slanting face 2202 to the light inlet face 102 is shorter than that from the second slanting face 2203. Moreover, please refer to FIG. 4C in conjunction with FIG. 4D. The first slanting face 2202 forms an angle α1 with respect to the first bottom face 2200 and the angle α1 ranges between 20° to 90°. The second slanting face 2203 forms an angle α2 with respect to the first bottom face 2200, and the angle α2 ranges between 0 to 70°. The first slanting face 2202 and the second slanting face 2203 meet above the first bottom face 2200, and the distance from the first bottom face 2200 to the meeting point ranges between 0.000001 to 1 mm. Please refer to FIG. 3 in conjunction with FIG. 4A. The first and second slanting faces 2202, 2203 resemble a reduced trapezoid. Therefore, the top width of the first and second slanting faces 2202, 2203 is larger than that of the bottom.

Figure 5:
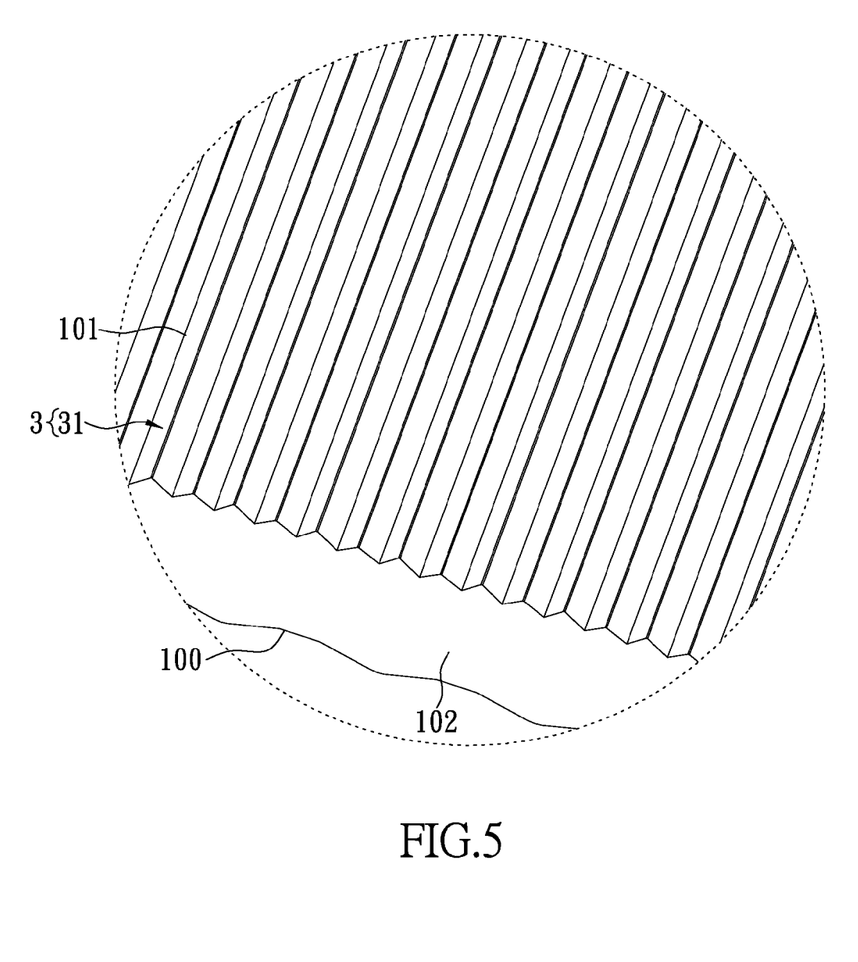
FIG. 5 is an enlarged view of region A in FIG. 1.
Figure 6A:
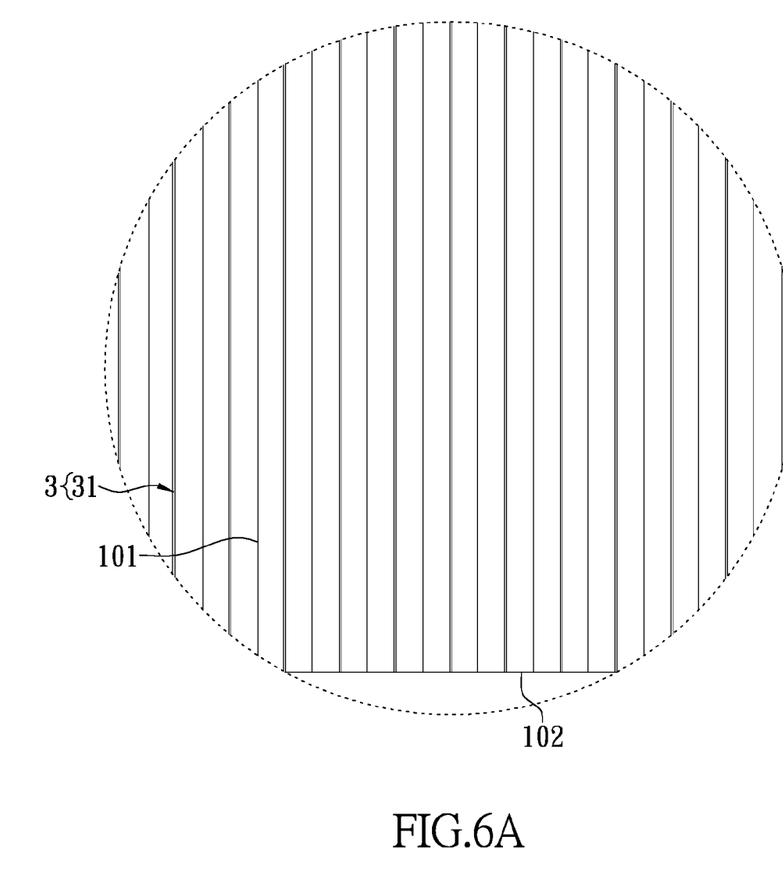
FIG. 6A is a top view of FIG. 5.
Figure 6B:
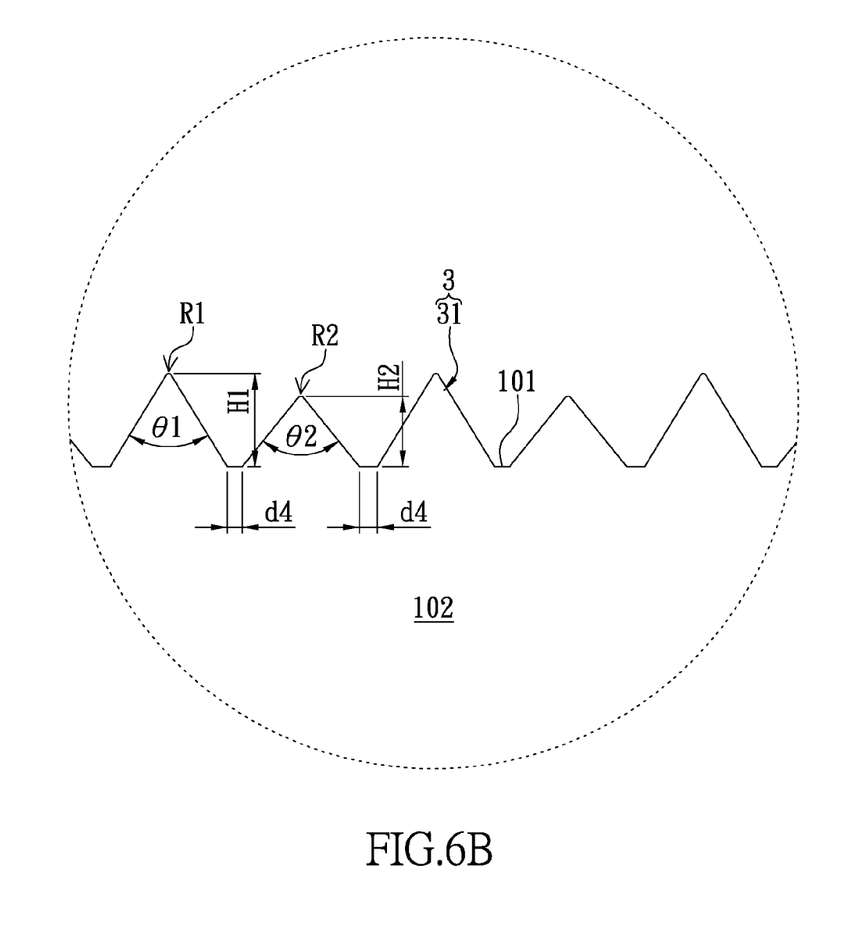
FIG. 6B is a side view of FIG. 5.

Please refer to FIGS. 1, 5 and 6A to 6B. FIG. 5 is an enlarged view of region A in FIG. 1. FIG. 6A is a top view of FIG. 5. FIG. 6B is a side view of FIG. 5. Please refer to FIG. 1 in conjunction with FIG. 5. The second light guiding unit 3 includes a plurality of third light guiding structures 31 formed on the second surface 101. The third light structures 31 are parallel arranged.

The configuration of the third light guiding structure 31 is elaborated herein.

Firstly, please refer to FIG. 5 in conjunction with FIG. 6B. The third light guiding structures 31 are parallel arranged. According to FIG. 6B, the sides of the third light guiding structures 31 are discrete zigzags. However, the instant disclosure is not limited to this configuration. The third light guiding structures may be continuous zigzags. In addition, as shown in FIG. 6B, the distance between the top corner of one third light guiding structure 31 to the second surface 101 is designated as H1. The distance between the top corner of another third light guiding structure 31 to the second surface 101 is designated as H2. H1 and H2 may be different, and the third light guiding structures 31 having different heights are alternatively arranged. Therefore, the third light guiding structures 31 weave an overall wavy contour because of different H1 and H2. Please refer to FIG. 5 in conjunction with FIG. 6B. The third light guiding structures 31 are equally spaced apart. More specifically, each pair of immediately abreast third light guiding structures 31 has the same gap d4. Of course, the gap may vary subject to design requirement.

Furthermore, as shown in FIGS. 5 and 6B, each of the third light guiding structures 31 is a triangular prism having a round corner R1. The round corner R1 has a radius no more than 2 mm (R1≤2 mm). The angle θ1 of the third light guiding structure 31 is no more than 175° (θ1≤175°). Further still, each of the third light guiding structures 31 is a trapezoid having truncated top (not shown). The trapezoid is wider at the bottom (i.e., the trapezoid reduces toward the top).

However, the configuration of the third light guiding structure 31 is not limited thereto.

Figure 7:
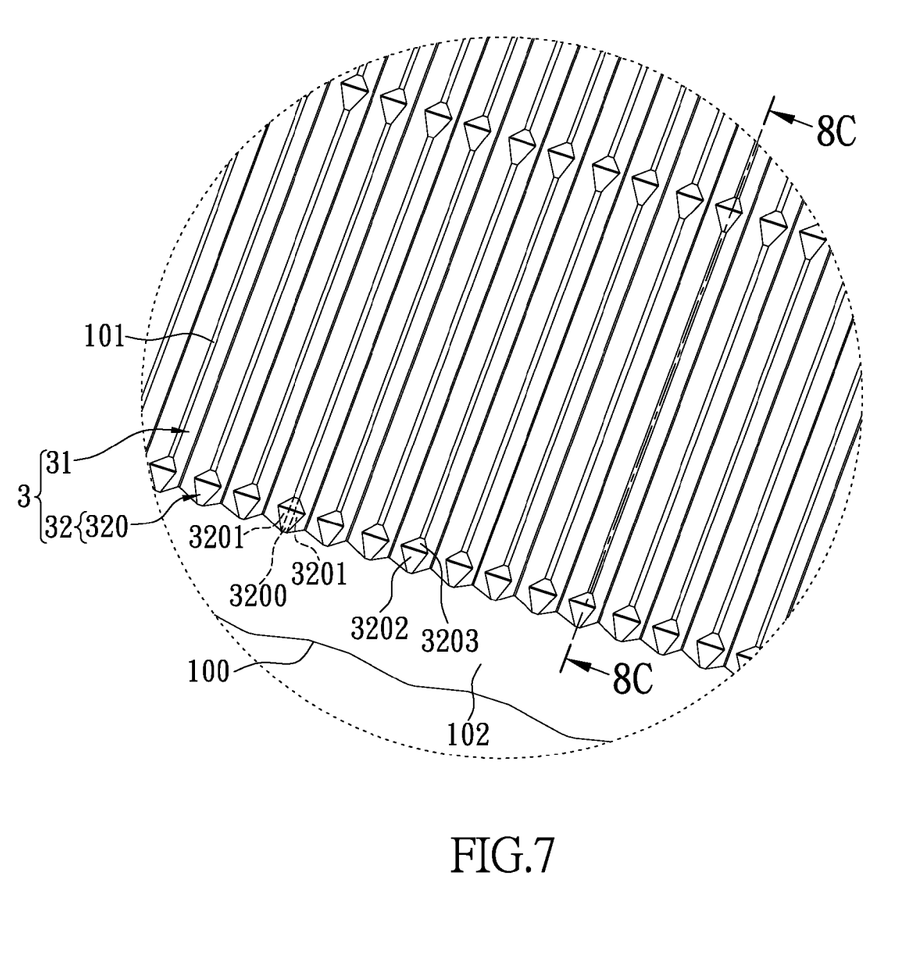
FIG. 7 is an enlarged view of region A in FIG. 1.
Figure 8A:
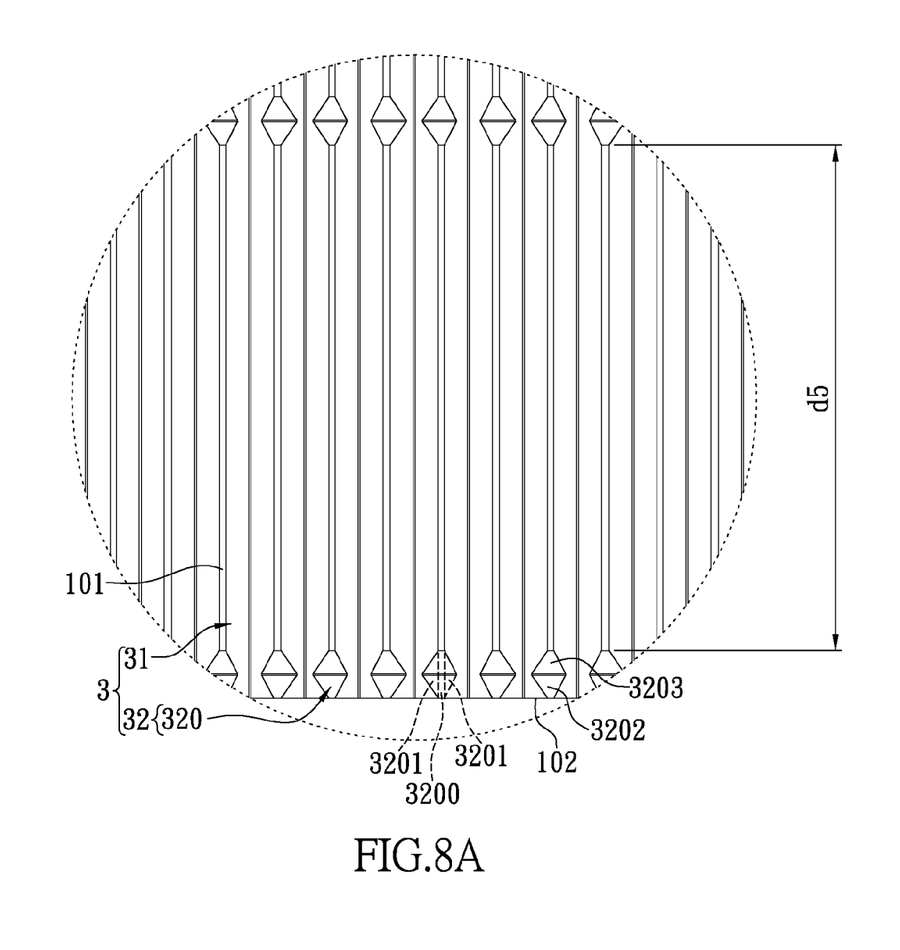
FIG. 8A is a top view of FIG. 7.
Figure 8B:
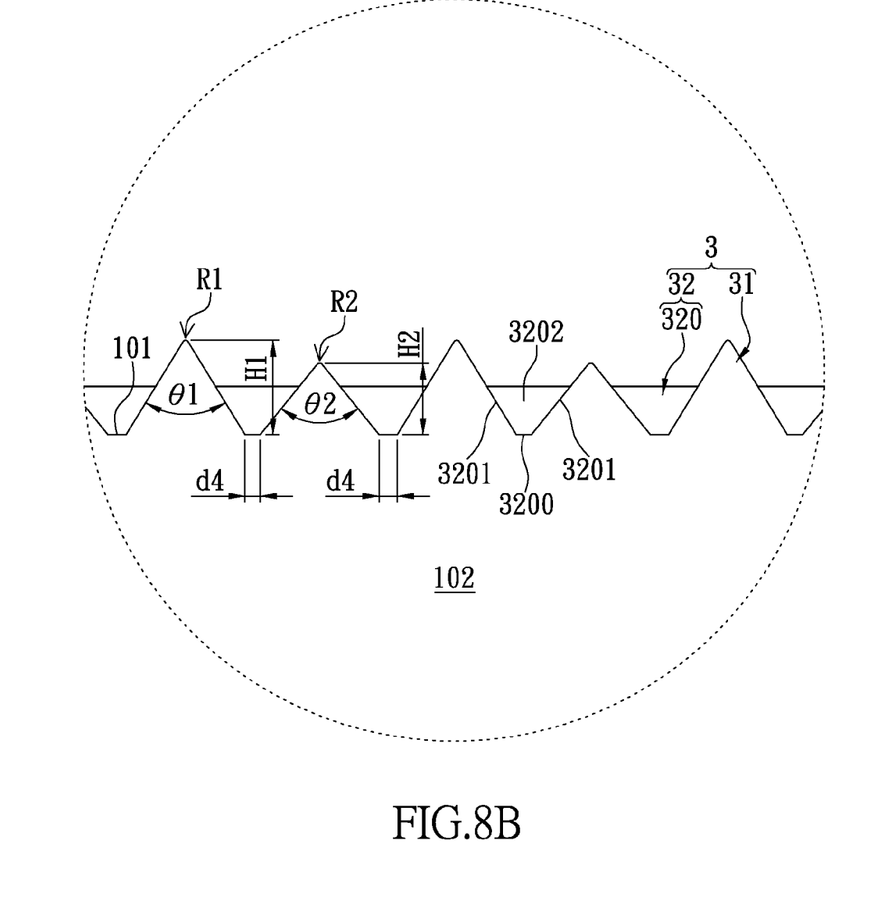
FIG. 8B is a side view of FIG. 7.
Figure 8C:
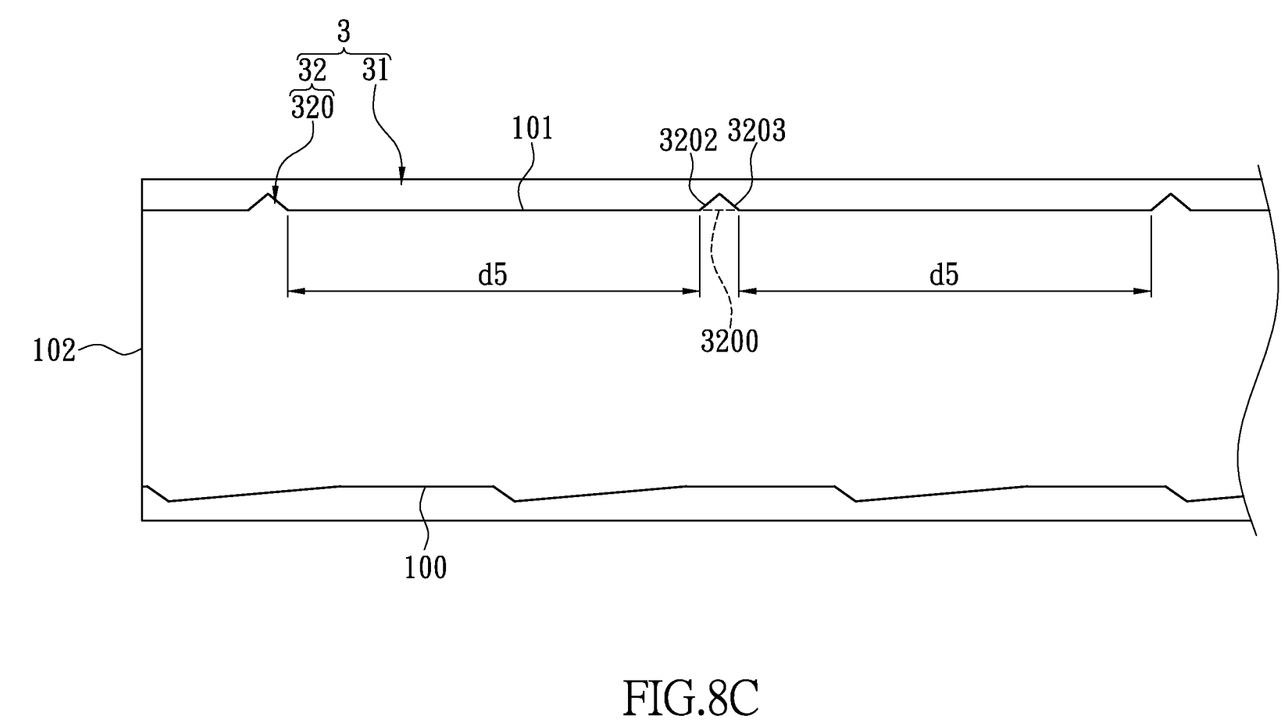
FIG. 8C is a cross-sectional view along line 8C-8C in FIG. 7.

Please refer to FIGS. 1, 7 and 8A to 8C. FIG. 7 is an enlarged view of region A in FIG. 1. FIG. 8A is a top view of FIG. 7. FIG. 8B is a side view of FIG. 7. FIG. 8C is a cross-sectional view along line 8C-8C in FIG. 7. Please refer to FIG. 1 in conjunction with FIG. 7. In addition to the third light guiding structures 31, the second light guiding unit 3 may also includes a plurality of fourth light guiding structures 32 formed on the second surface 101. The fourth light guiding structures 32 are parallel arranged.

The configuration of the fourth light guiding structure 32 is further elaborated herein.

Firstly, please refer to FIGS. 7, 8A and 8C. Each fourth light guiding structure 32 includes a plurality of second light guiding bodies 320 connecting two abreast third light guiding structures 32. The second light guiding bodies 320 are equally spaced apart. In other words, as show in FIGS. 8A and 8C, the second light guiding bodies 320 have the same gap d5 therebetween. Of course, the gap between each pair of the second light guiding bodies 320 may vary according to design requirement.

Please refer to FIGS. 7 and 8A to 8C. Each of the second light guiding body 320 has a second bottom face 3200, two second connecting faces 3201, a third slanting face 3202 and a fourth slanting face 3203. As shown in FIG. 8C, a reference line is depicted on the bottom of the second light guiding body 320 to emphasize the second bottom face 3200. The second bottom face 3200 is flushed against the second surface 101, and therefore the second bottom face 3200 and the second surface 101 are coplanar. The two second connecting faces 3201 slantingly extend from the second bottom face 3200 to connect the two neighboring third light guiding structures 31. In other words, the second connecting face 3201 is completely attached to the surface of the third light guiding structure 31. Therefore, the second connecting face 3201 and the surface of the third light guiding structure 31 are coplanar. The third slanting face 3202 and the fourth slanting face 3203 extend from the second bottom face 3200 and meet above the second bottom face 3200.

Furthermore, please refer to FIG. 8A in conjunction with FIG. 8C. The area of the third slanting face 3202 and the fourth slanting face 3203 of each second light guiding body 320 is the same. The third and fourth slanting faces 3202, 3203 resemble a trapezoid having broader top and narrower bottom. Therefore, the top width of the third and fourth slanting faces 3202, 3203 is wider than that of the bottom. Of course, the third and fourth slanting faces 3202, 3203 may resemble up-side-down triangle (not shown), and the area of each third and fourth slanting faces 3202, 3203 may be different. The instant disclosure is not limited thereto.

In short, the multi-dimensional first and second light guiding units 2, 3 enhance the strength for retaining the optical film (not shown) and reduce unwanted light loss (for example, loss caused by light diffusion). The overall brightness increases thereby, and the occurrence of optical interference stripe or Moire (for example, Newton's rings) is reduced. Generally, the optical effectiveness is greatly improved.

[Second Embodiment]

Figure 9:
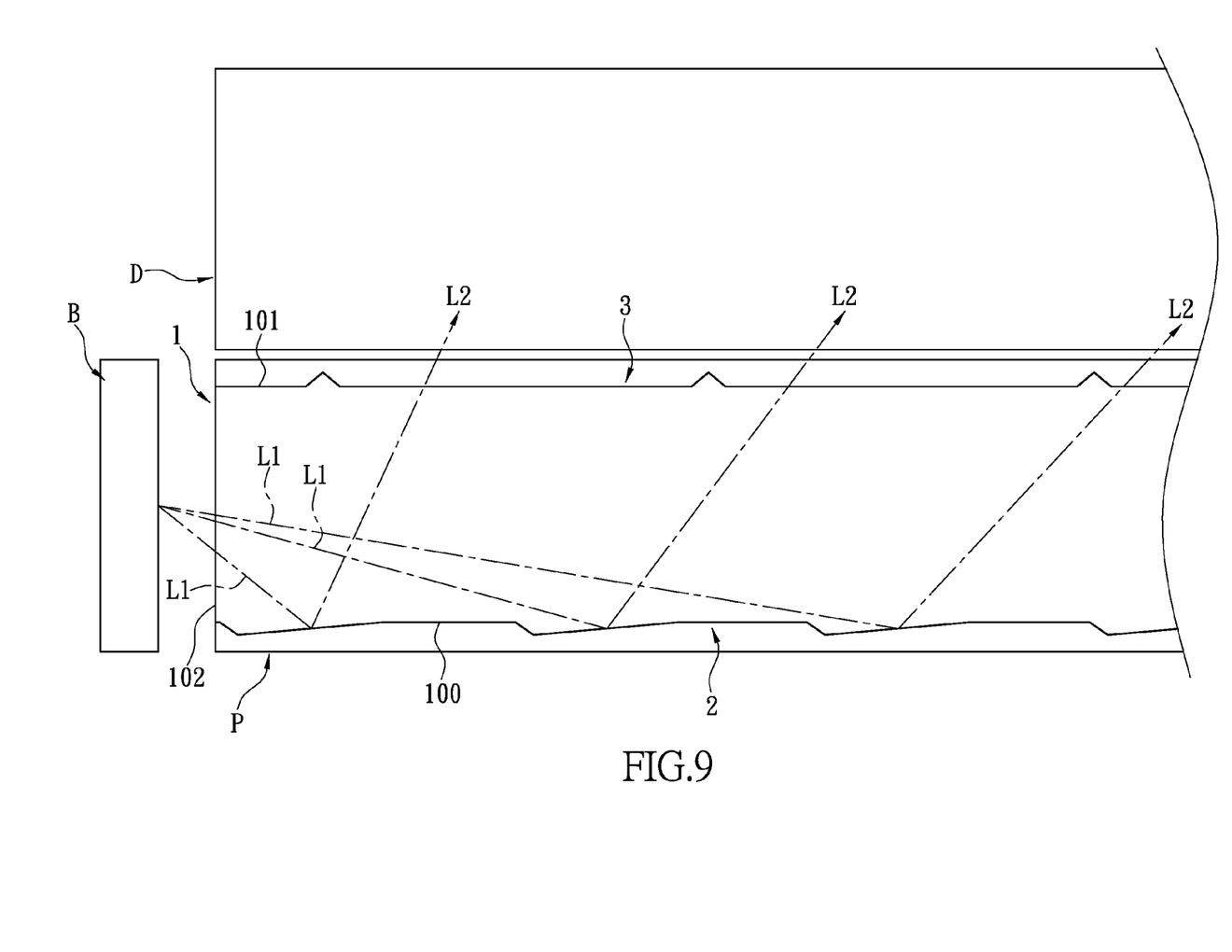
FIG. 9 is a schematic diagram of a backlight module and a display device in accordance with an embodiment of the instant disclosure.

Please refer to FIG. 9. The second embodiment of the instant disclosure provides a backlight module. The backlight module includes a light guiding plate P and light emitting components B. The light emitting components B are disposed proximate to the light inlet face 102, and the light beam L1 generated by the light emitting components B enters the light guiding main body 1 via the light inlet face 102. For example, when the first surface 100 is the reflection face and the second surface 101 is the light outlet face, the light beam L1 enters the light guiding main body 1 through the light inlet face 102 and forms reflection beam L2 by attacking the first light guiding unit 2. The reflection beam L2 goes through the second light guiding unit 3 and projects like a sheet toward the exterior.

[Third Embodiment]

Please refer to FIG. 9. The third embodiment of the instant disclosure provides a display device. The display device includes a light guiding plate P, light emitting components B and a display panel D. The light emitting components B are disposed proximate to the light inlet face 102. The light beam L1 from the light emitting components B enters the light guiding main body 1 via the light inlet face 102. The display panel D is disposed on top of the light guiding plate P, and the light beam L1 travels through the light guiding plate P and projects on to the display panel in the form of a sheet. For example, when the first surface 100 is the reflection face and the second surface 101 is the light outlet face, the light beam L1 enters the light guiding main body 1 through the light inlet face 102 and forms reflection beam L2 by attacking the first light guiding unit 2. The reflection beam L2 goes through the second light guiding unit 3 and projects like a sheet toward the display panel D.

Furthermore, in the first, second and third embodiments of the instant disclosure, the light guiding plate P may also have a reflection layer (not shown) formed or attached on the reflection face to enhance the reflection efficiency. The reflection layer helps to increase the overall light emitting efficiency of the light guiding plate P. However, the reflection layer is an optional element.

In summary, the light guiding plate P, backlight module and the display device using the same have the multi-dimensional, first light guiding unit 2, which has the pluralities of first and second light guiding structures 21, 22 and the second light guiding 3 unit, which has the plurality of third light guiding structures 31. The light guiding units 2, 3 enhance the strength for retaining an optical film and reduce any unwanted light loss (for example, loss caused by light diffusion). The overall brightness increases thereby, and the occurrence of optical interference stripe or Moire (for example, Newton's rings) is reduced. Generally, the optical effectiveness is greatly improved.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A light guiding plate, comprising:
    a light guiding main body having a first surface, a second surface opposite to the first surface and a light inlet face connecting between the first and second surfaces;
    a first light guiding unit including a plurality of first light guiding structures and a plurality of second light guiding structures disposed on the first surface, wherein the pluralities of the first and second light guiding structures are parallel aligned, each of the second light guiding structures has a plurality of first light guiding bodies disposing separately and connecting to the adjacent first light structures respectively, and an arrangement density of the plurality of first light guiding bodies decreases toward the light inlet face; and a second light guiding unit including a plurality of third light guiding structures disposed on the second surface, wherein the plurality of the third light guiding structures is parallel arranged;

wherein the third light guiding structures have two different heights and the two different heights are alternatively arranged.

2. The light guiding plate according to claim 1, wherein each of the first light guiding bodies has a first bottom face flushed with the first surface, two first connecting faces slantingly connecting two adjacent first light guiding structures, a first slanting face and a second slanting face, each of the first slanting face and the second slanting face forms a tilting angle with respect to the first bottom face, and the first slanting face and the second slanting face joints above the first bottom surface.

3. The light guiding plate according to claim 2, wherein an angle between the first slanting face and the first bottom face ranges between 20° to 90°, an angle between the second slanting face and the first bottom face is smaller than 70°, and a distance between the joint of the first and second slanting face and the bottom face is smaller than 1 mm.

4. The light guiding plate according to claim 1, wherein each of the first light guiding structures is substantially a triangular prism having acute or round corner or a trapezoid having truncated top.

5. The light guiding plate according to claim 1, wherein the second light guiding unit includes a plurality of fourth light guiding structures formed on the second surface, each of the fourth light guiding structures has a plurality of second light guiding bodies disposing respectively and connecting two adjacent third light guiding structures.

6. The light guiding plate according to claim 5, wherein each of the second light guiding bodies has a second bottom face flushing with the second surface, two second connecting faces slantingly connecting two adjacent third light guiding structures, a third slanting face and a fourth slanting face, each of the third slanting face and the fourth slanting face forms a tilting angle with respect to the second bottom face, and the third slanting face and the fourth slanting face joints above the second bottom surface.

7. The light guiding plate according to claim 6, wherein the third slanting face, the fourth slanting face and the second bottom face form an inverted trapezoid or an up-side-down triangle.

8. The light guiding plate according to claim 1, wherein each of the third light guiding structures is substantially a triangular prism having acute or round corner or a trapezoid having truncated top.

9. A backlight module comprising:
a light guiding plate including:
a light guiding main body having a first surface, a second surface opposite to the first surface and a light inlet face connecting between the first and second surfaces;
a first light guiding unit including a plurality of first light guiding structures and a plurality of second light guiding structures disposed on the first surface, wherein the pluralities of the first and second light guiding structures are parallel aligned, each of the second light guiding structures has a plurality of first light guiding bodies that is individually separating and connecting the immediately abreast first light structures, and the arrangement density of the plurality of first light guiding bodies decreases toward the light inlet face; and a second light guiding unit including a plurality of third light guiding structure disposed on the second surface, wherein the plurality of the third light guiding structures are parallel arranged; and a plurality of light emitting components disposed proximate to the light inlet face, wherein a light generated by the light emitting components enters the light guiding main body via the light inlet face;

wherein the third light guiding structures have two different heights and the two different heights are alternatively arranged.

10. A display device comprising:
a light guiding plate including:
a light guiding main body having a first surface, a second surface opposite to the first surface and a light inlet face connecting between the first and second surfaces;
a first light guiding unit including a plurality of first light guiding structures and a plurality of second light guiding structures disposed on the first surface, wherein the pluralities of the first and second light guiding structures are parallel aligned, each of the second light guiding structures has a plurality of first light guiding bodies that is individually separating and connecting the immediately abreast first light structures, and an arrangement density of the plurality of first light guiding bodies decreases toward the light inlet face; and a second light guiding unit including a plurality of third light guiding structure disposed on the second surface, wherein the plurality of the third light guiding structures are parallel arranged;

a plurality of light emitting components disposed proximate to the light inlet face, wherein a light generated by the light emitting components enters the light guiding main body via the light inlet face; and a display panel disposed on the top of the light guiding plate, wherein the light generated by the light emitting components travels through the light guiding plate and projects onto the display panel;

wherein the third light guiding structures have two different heights and the two different heights are alternatively arranged.

* * * * *